US008978077B2

(12) United States Patent
Elster et al.

(10) Patent No.: US 8,978,077 B2
(45) Date of Patent: Mar. 10, 2015

(54) VIDEO CONTENT PRESENTATION (75) Inventors: Constantine Elster, Haifa (IL); Ron Keidar, Haifa (IL); Nela Gurevich, Kiriyat Yam (IL); Stephen Verrall, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 665 days.

(21) Appl. No.: 12/390,828

(22) Filed: Feb. 23, 2009

(65) Prior Publication Data

US 2010/0218226 A1   Aug. 26, 2010

(51) Int. Cl.
*H04N 7/173* (2011.01)
*H04N 21/234* (2011.01)
*H04N 21/432* (2011.01)
*H04N 21/438* (2011.01)
*H04N 21/44* (2011.01)

(52) U.S. Cl.
CPC ..... *H04N 21/23406* (2013.01); *H04N 21/4325* (2013.01); *H04N 21/4384* (2013.01); *H04N 21/44004* (2013.01)
USPC .......................................................... 725/94

(58) Field of Classification Search
CPC .................... H04N 21/44004; H04N 21/4384
USPC ............................................. 725/87, 90–94
See application file for complete search history.

(56) References Cited

U.S. PATENT DOCUMENTS

| 7,373,413 | B1 | 5/2008 | Nguyen et al. |
| 7,444,419 | B2 | 10/2008 | Green |
| 2003/0159151 | A1* | 8/2003 | Ikeda ................................ 725/58 |
| 2004/0032916 | A1 | 2/2004 | Takashima |
| 2004/0255328 | A1* | 12/2004 | Baldwin et al. ................. 725/90 |
| 2005/0071886 | A1* | 3/2005 | Deshpande ..................... 725/135 |
| 2006/0072671 | A1 | 4/2006 | Aggarwal et al. |
| 2006/0083263 | A1* | 4/2006 | Jagadeesan et al. .......... 370/487 |
| 2006/0095472 | A1* | 5/2006 | Krikorian et al. .......... 707/104.1 |
| 2006/0165166 | A1 | 7/2006 | Chou et al. |
| 2007/0143800 | A1* | 6/2007 | Salomons ....................... 725/74 |
| 2007/0214490 | A1* | 9/2007 | Cheng et al. ................... 725/135 |
| 2007/0271388 | A1* | 11/2007 | Bowra et al. ................... 709/231 |
| 2008/0008281 | A1 | 1/2008 | Abrol et al. |
| 2008/0152311 | A1 | 6/2008 | Levy et al. |

FOREIGN PATENT DOCUMENTS

| CN | 1427627 A | 7/2003 |
| CN | 101243688 A | 8/2008 |
| JP | 2004015111 A | 1/2004 |
| JP | 2006513608 A | 4/2006 |

(Continued)

OTHER PUBLICATIONS

Taiwan Search Report—TW099105193—TIPO—Jan. 24, 2013.

(Continued)

*Primary Examiner* — Hai V Tran
*Assistant Examiner* — Aklil Tesfaye
(74) *Attorney, Agent, or Firm* — Heejong Yoo (57) ABSTRACT Systems and methods to present video content are disclosed. According to an embodiment, a method of processing video data is disclosed. The method includes receiving timing information associated with the video data. The received timing information is indicative of a start time to start presentation of video content corresponding to the video data. The method includes starting presentation of the video content at a time prior to the start time. The method also includes increasing a presentation rate of the video content.

31 Claims, 12 Drawing Sheets (56) References Cited

FOREIGN PATENT DOCUMENTS

| JP | 2007195195 A | 8/2007 |
|----|--------------|--------|
| JP | 2010171919 A | 8/2010 |
| KR | 20050090448 A | 9/2005 |
| WO | WO2004062291 | 7/2004 |

OTHER PUBLICATIONS

International Search Report and Written Opinion—PCT/US10/024704, International Search Authority—European Patent Office, May 6, 2010.

Kalman M, et al., "Adaptive Media Playout for Low-Delay Video Streaming Over Error-Prone Channels" IEEE Transactions on Circuits and Systems for Video Technology, IEEE Service Center, Piscataway, NJ, US, LNKD-DOI:10.1109/TCSVT.2004.828335, vol. 14, No. 6, Jun. 1, 2004, pp. 841-851, XP001196871.

Steinbach, et al., "Adaptive playout for low latency video streaming" Proc. 2001 Int. Conf. on Image Processing; Thessaloniki, Greece, LNKD-DOI:10.1109/ICIP.2001.959207, vol. 1, Oct. 7, 2001, pp. 962-965, XP010565021.

* cited by examiner

VIDEO CONTENT PRESENTATION

I. FIELD

The present disclosure is generally related to presentation rate of received video frames in a media player.

II. DESCRIPTION OF RELATED ART

Although many electronic devices can present moving video "on demand," there is often a delay between the time of the demand and the presentation of the video. Devices that can present video data include televisions, set top boxes, cellular phones, and standalone video players. The user of a video processing device can often select from a plurality of channels, each channel delivering its own video content. Delays often occur as a user changes channels.

III. SUMMARY

Embodiments described herein provide methods and devices that accelerate playback of video frames during an initial time interval that begins when a demand for new video is made, such as when a new source of video data is first selected. For example, when a user changes channels, an initial buffering delay can be overcome by presenting video content during the time of the buffering delay upon the selection of a new channel without waiting for the buffering delay to end before the content is presented. During the initial time interval, video frames are timed to be presented at an accelerating rate until a substantially constant presentation rate is reached. Systems and methods disclosed herein may be incorporated into cellular phones, set top boxes, and other video processing devices.

In a particular embodiment, a method of processing video data is disclosed. The method includes receiving timing information associated with the video data. The received timing information is indicative of a start time to start presentation of video content corresponding to the video data. The method includes starting presentation of video content corresponding to the video data at a time prior to the start time. The method also includes increasing a presentation rate of the video content prior to the start time.

In another particular embodiment, an apparatus is disclosed that includes a delay determination element to determine a delayed start time for presenting video content corresponding to received video data. The apparatus also includes a timing adjustment mechanism to determine a timing of the presentation of video content corresponding to the received video data during a time interval prior to an indicated start time, where the timing of the presentation content corresponds to a presentation rate of video content that increases during the time interval.

In another particular embodiment, a computer readable tangible medium is disclosed that stores computer code to cause a computer to determine a first presentation start time at least in part based on a parameter of received video data. The embodiment also includes computer code to cause the computer to adjust a timing of video frames of the video data to enable presentation of the video frames before the start time and at a rate that increases with time.

In another particular embodiment, an apparatus includes means for determining a presentation start time from a parameter received with video data. The apparatus includes means for adjusting a timing of presentation of video frames of the video data during a specified time interval as a function of the parameter, where the adjusted timing corresponds to a rate of presenting the video frames that increases with time. The apparatus also includes means for initiating presenting video frames according to the adjusted timing.

Thus, a particular advantage of disclosed embodiments is that the playback of video frames is accelerated during a specified time interval. The accelerated playback may result in a shorter delay of presentation of video data when a user changes video channels, as compared to systems that delay the start of presentation of new video content. Other aspects, advantages, and features of the present disclosure will become apparent after review of the entire application, including the following sections: Brief Description of the Drawings, Detailed Description, and the Claims.

V. DETAILED DESCRIPTION

Figure 1:
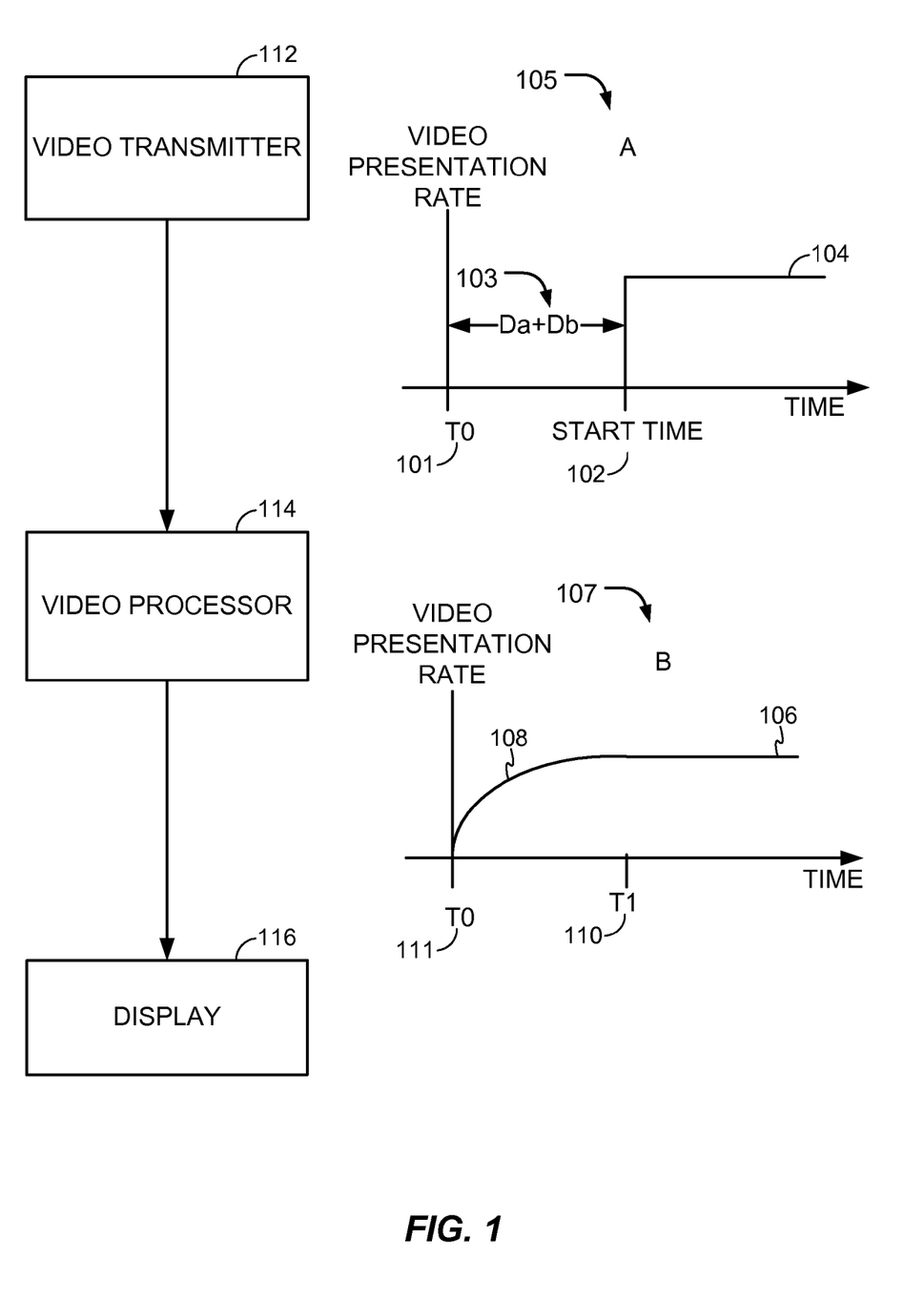
FIG. 1 is a diagram of an illustrative embodiment of a system used to display video data, with graphs illustrating a start time for presentation of video data and an increasing presentation rate of the video data.

FIG. 1 is a system diagram of an illustrative embodiment of a system used to display video data, with graphs illustrating a start time for presentation of video data and an increasing presentation rate of the video data. FIG. 1 shows a video transmitter 112, a video processor 114, and a display device 116 to display video data along with a graph A 105 illustrating a start time for presentation of video data and a graph B 107 illustrating an increasing presentation rate of the video data. The video transmitter 112 transmits video data and also transmits timing information from which a presentation start time can be determined.

Referring to graph A 105, at an initial time, T0 101, a user selects a new video channel. The video transmitter 112 may respond by transmitting timing information and video data. A presentation start time 102 is derived from the timing information received from the transmitter 112. A conventional receiver that receives the timing information can present the video frames of video data starting at the presentation start time T1 102, and continue to present video frames at a constant rate 104. Thus, without embodiments of the video processor 114 described herein, there is a delay from the time when a user selects a video channel to the time that video begins to be displayed.

The delay in start time is denoted Da+Db, 103. Da is a delay, typically on the order of a few hundred milliseconds, associated with a transmitter of the video data which is intentionally inserted into the data stream to cause a playback delay in the video processor. Da may be based on a network characteristic to cause buffering at a receiver to compensate for network delays. Db is a delay, typically of a half-second or more, associated with the player of the video data which is also intentionally inserted into the data stream to cause a playback delay at the video processor. When combined, these two delays set an initial buffering time. The combined delay 103 manifests itself when a user of the video processor first begins to receive video data or when the user changes from one video channel or source to another. Thus, when a new channel is first selected, there is a delay, Da+Db 103, between the time at which first video data is received from the newly-selected channel and the time at which the video frames of the channel are first presented. This delay may be a hindrance or an annoyance to the user. For example, the delay may prevent a user from being able to initiate video playback, from being able to select a different video, or from being able to change channels smoothly without delay in the presentation of content.

Referring to graph B 107, the video processor 114, according to embodiments described herein, does not buffer and delay presentation of video frames until the presentation start time 102. Rather, as depicted by the curve 108, presentation of video frames to the display 116 may begin when a new channel or video stream is selected and video data is first received at time T0, 111. Presentation of video data starts at a slow rate and increases until a constant presentation rate 106 is achieved by the time T1 110. The time interval from T0 to T1 is referred to herein as a buildup time interval.

By initiating display of video content prior to the start time 102 at an accelerating rate, as depicted in graph B 107, the user may experience substantially immediate play of video upon selecting a new video source or channel without having to wait for an imposed buffering delay.

Figure 2:
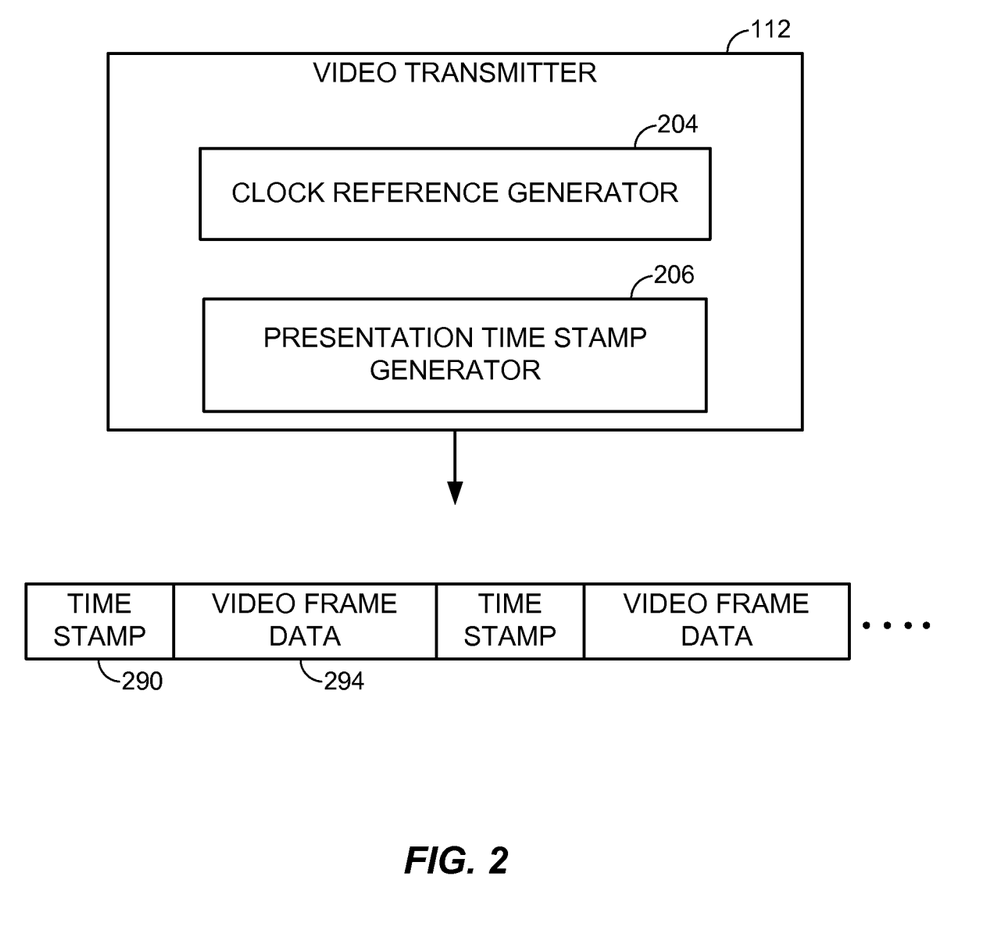
FIG. 2 is a block diagram of an embodiment of a video transmitter.

FIG. 2 is a block diagram of an embodiment of a video transmitter 112 that may generate audio/video data and that transmits video data either wirelessly or by wireline. The video transmitter 112 can provide a continuous stream of digital audio/video data. In a particular embodiment, the video content is encoded to be presented in video frames. Each video frame corresponds to a view of a time-varying image at a particular point in time. The video transmitter 112 includes both a clock reference generator 204 and a presentation time stamp generator 206. The clock reference generator 204 generates reference clock time stamps that are inserted into the audio/video data to be transmitted to a receiver such as the video processor 114 of FIG. 1. The reference clock time stamps enable the video processor 114 to synchronize the clock frequency of the video processor 114 with the clock frequency of the clock of the video transmitter 112. The presentation time stamp generator 206 generates presentation time stamps 290 that are also inserted in the audio/video data stream. The presentation time stamps 290 inform the video processor at what time the video frames are to be presented by a video processor that receives the video data created by video transmitter 112. Thus, the video transmitter 112 provides a stream of video data including video frame data 294 that is interspersed with presentation time stamps 290.

Figure 3:
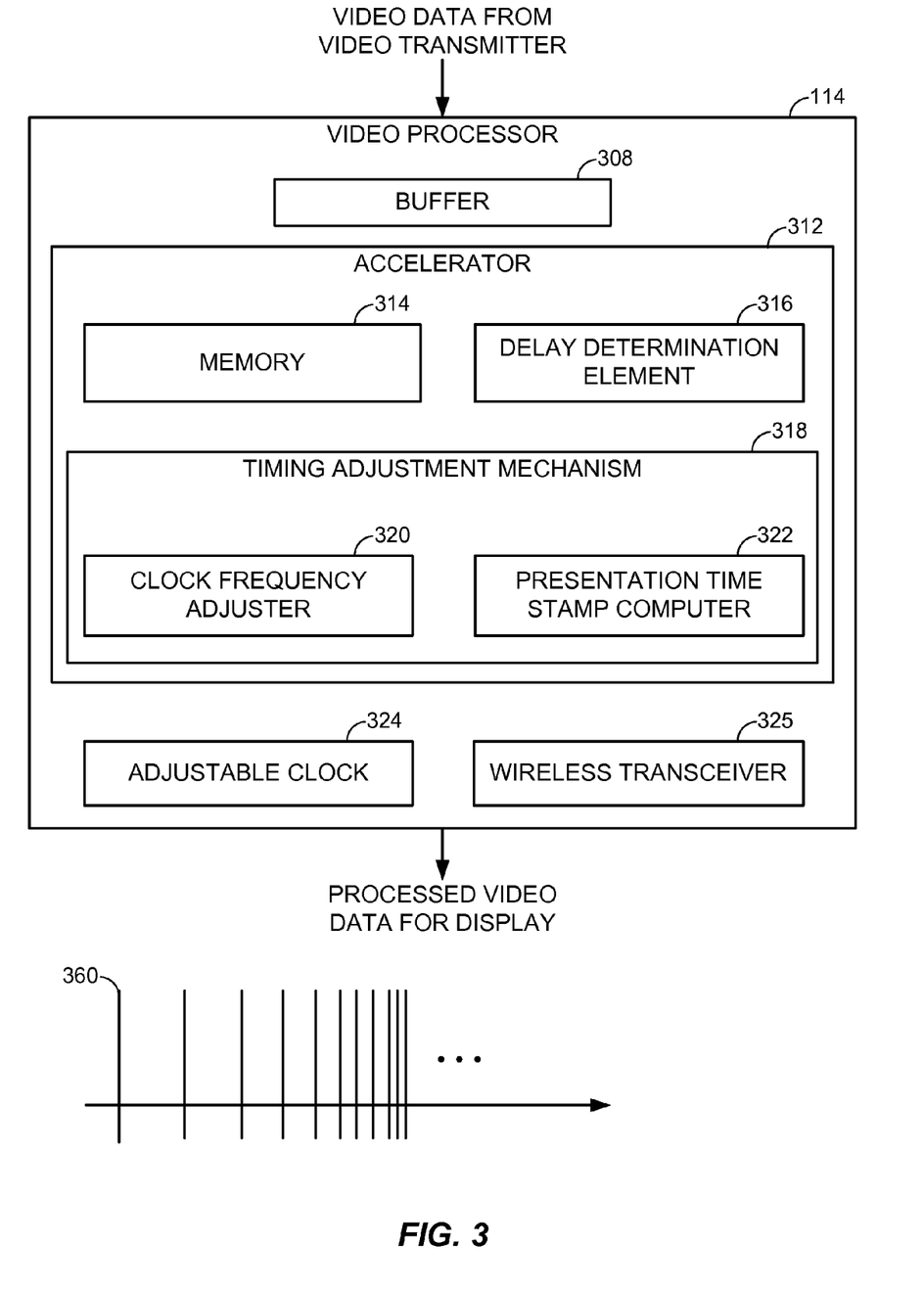
FIG. 3 is a block diagram of an embodiment of a video processor.

FIG. 3 shows an embodiment of the video processor 114. The video processor 114 includes a buffer 308 and an accelerator 312. The buffer 308 is configured to buffer frames prior to playback, based on a setting of the video processor. The accelerator 312 is configured to accelerate the rate at which a video frame presenter, such as the display 116 of FIG. 1, presents video frames during an initial buildup time interval until the rate at which video frames are presented is substantially constant. The accelerator 312 has a timing adjustment mechanism 318 to affect the timing of presentation of video frames during the buildup time interval. The accelerator 312 also includes a memory 314 to store parameters of different acceleration functions, as will be explained more fully below. The accelerator 312 also includes a delay determination element 316 to determine the delays Da and Db. These delays, combined with the parameters stored in the memory 314, are used by the timing adjustment mechanism 318 to compute a function that determines a rate at which video frames are to be presented.

In some embodiments, the timing adjustment mechanism 318 operates in one of two modes that may be selected by a user. In one mode of operation, a clock frequency adjuster 320 adjusts a frequency of an adjustable clock 324 used to determine times at which to present video frames. In another mode of operation, a presentation time stamp computer 322 computes advanced presentation time stamps used to determine times at which to present video frames. In some embodiments, a wireless transceiver 325 enables the video processor 114 to transmit and receive data by way of Radio Frequency (RF) communications, or other wireless transmission. In some embodiments, an adjustable clock is not included. Further, in some embodiments a wireless transceiver is not included.

FIG. 3 also illustrates an example of an acceleration of video frames resulting from an operation of the accelerator 312. Presentation of the video frames 360 starts at a slow rate and increases so that the time between adjacent frames decreases until a substantially constant playback rate is reached. The increasing rate of presentation of video frames is the result of either advancing presentation time stamps or increasing clock frequency of the adjustable clock 324.

Figure 4:
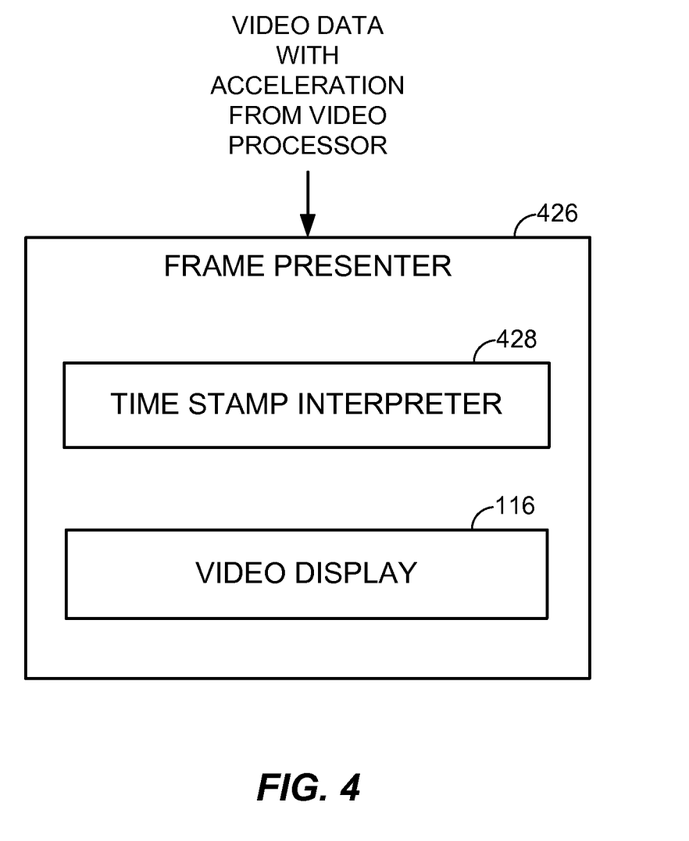
FIG. 4 is a block diagram of an embodiment of a frame presenter.

FIG. 4 shows a video frame presenter 426. The video frame presenter 426 includes a time stamp interpreter 428 to interpret a presentation time stamp by reference to a clock, such as the adjustable clock 324 of FIG. 3, so the video frame presenter 426 knows when to present each video frame at a video display, such as the video display 116.

Figure 5:
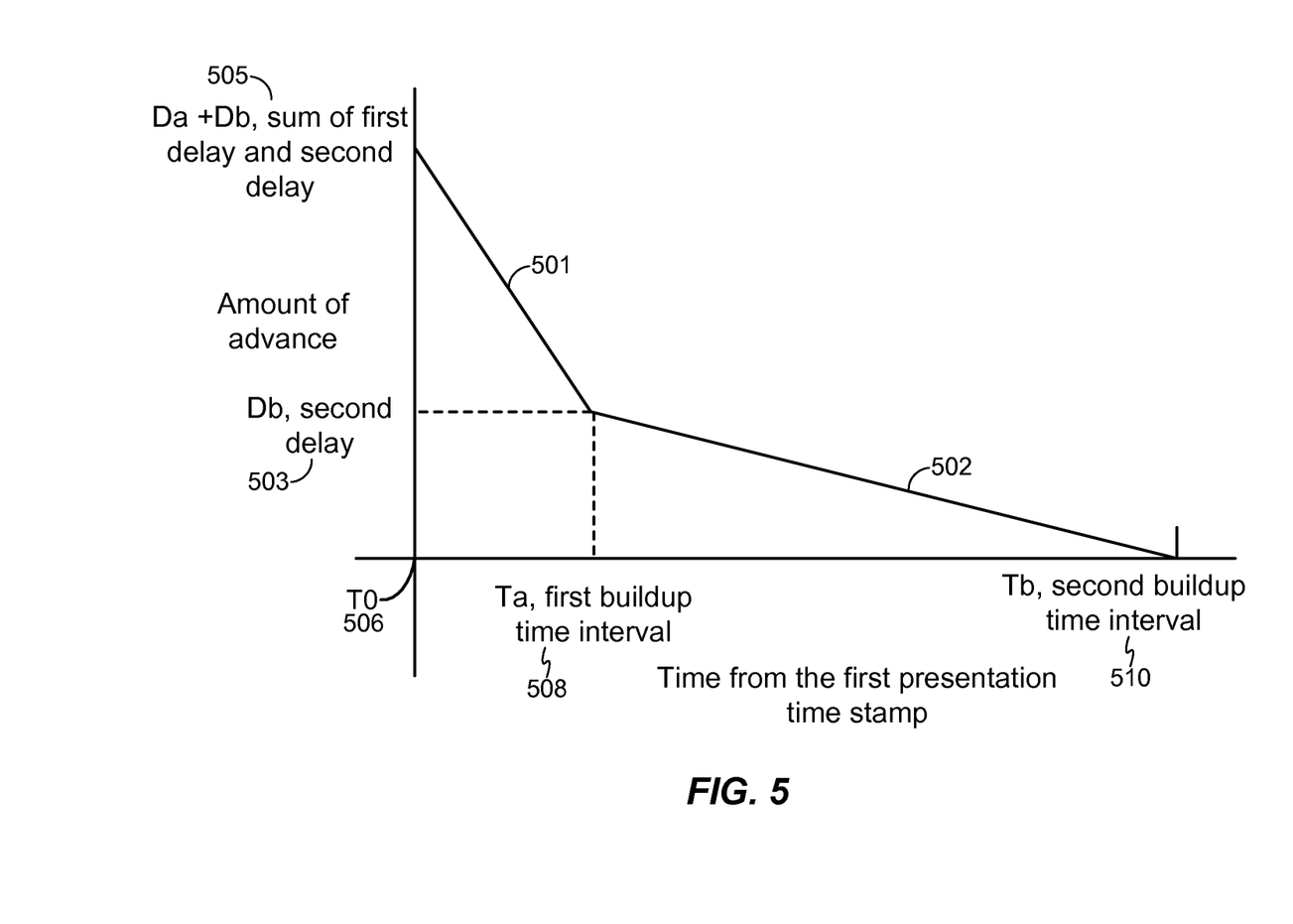
FIG. 5 is a graph of an embodiment of a piecewise linear function for computing video presentation time stamps.

FIG. 5 is a graph of an embodiment of a piecewise linear function for computing video presentation time stamps, such as may be employed by the timing adjustment mechanism 218 (FIG. 2). Two lines 501 and 502 are shown for accelerating presentation time stamps. Each line 501 and 502 has a different slope and thus each line 501 and 502 provides a different rate of acceleration. The first line 501 starts at time T0 506, which may correspond to when a user changes video channels, and ends at time Ta 508. The second line 502 starts at time Ta 508 and ends at time Tb 510. An equation of the first line 501 is given by Eq. (1):

$$P_i = -\left(\frac{D_a}{T_a}\right)(PTS_i - PTS_0)(D_a + D_b) \tag{1}$$

In Eq. (1), $PTS_0$ is a first presentation time stamp and $PTS_i$ is a time subsequent thereto, such that $PTS_i-PTS_0$ represents an amount of time between an initial frame and an ith frame. An equation of the second line is given by Eq. (2):

$$P_i = \left(\frac{D_b}{T_b - T_a}\right)(T_b + PTS_0 - PTS_i) \quad (2)$$

In Eq. (2), $PTS_0$ is a first presentation time stamp and $PTS_i$ is a time subsequent to the first presentation time stamp. At time T0 506, a presentation time stamp is advanced by Da+Db 505. At time Ta 508, a presentation time stamp is advanced by an amount Db 503. At time Tb 510, presentation time stamps are no longer being advanced and subsequent frames are presented at a substantially constant playback rate. Thus, the lines 501 and 502 represent a decreasing function of time over the buildup time interval. In the first part of the buildup time interval, presentation time stamps are advanced by an amount that decreases with time according to a first slope. In the second part of the buildup time interval, presentation time stamps are advanced by an amount that decreases with time according to a second slope that is less than the first slope. When the video frames are presented at the computed advanced presentation times, video frames are presented at an increasing rate until a substantially constant presentation rate is achieved at the end of the buildup time interval.

Figure 6:
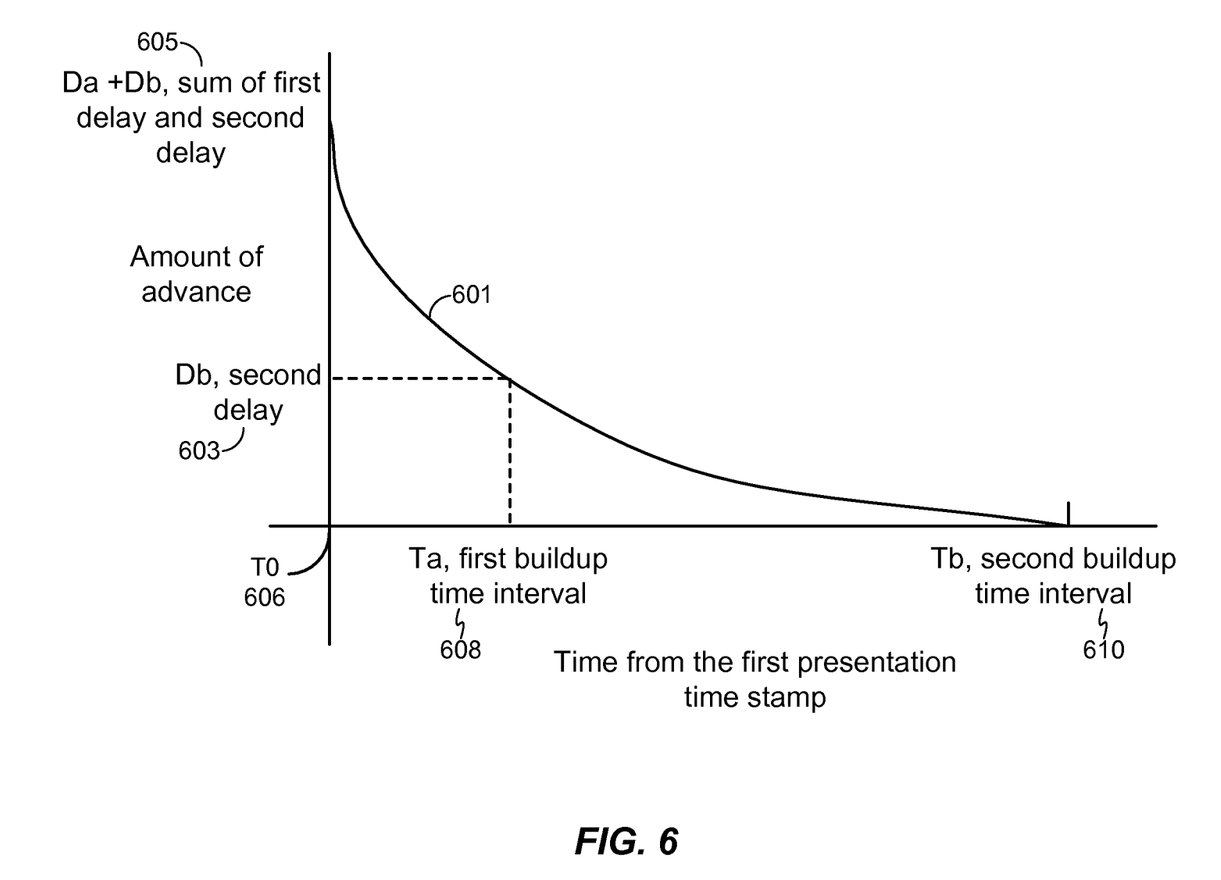
FIG. 6 is a graph of an embodiment of a decreasing function for computing video presentation time stamps.

FIG. 6 is a graph of an embodiment of an alternative function for accelerating presentation time stamps. The graph illustrates a curve, P(t) 601, that is a decreasing function of time for computing each presentation time stamp. The curve 601 may be computed according to Eq. (3):

$$P(t) = kt^m + n \quad (3)$$

The expressions for t, m, k, and n used in Eq. (3) are given by Eqs. (4)-(7), respectively:

$$t = PCR_i - PCR_0 \quad (4)$$

$$m = \log_{(T_a/T_b)}\left(\frac{D_a}{D_a + B_b}\right) \quad (5)$$

$$k = \frac{-D_a}{T_a^m} \quad (6)$$

$$n = D_a + D_b \quad (7)$$

In Eq. (4), $PCR_0$ is a first clock reference time and $PCR_i$ is a clock reference time subsequent to $PCR_0$. The curve P(t) 601 has a negative slope that decreases and approaches zero at the end of a buildup time interval. When the video frames are presented at the advanced presentation times computed by Eq. (4), video frames are presented at an increasing rate until a substantially constant presentation rate is achieved at the end of the buildup time interval. Thus, at time T0 606, an advance of a presentation time stamp is equal to Da+Db 605. At time Ta 608, an advance of a presentation time stamp is Db 603. Finally, at time Tb 610, an advance of presentation time stamps is approximately zero, and presentation continues at a constant rate.

Thus, in some embodiments, increasing the presentation rate of the video content includes computing advanced presentation time stamps. In some embodiments, during an initial presentation rate buildup time interval, a first rate of advance of presentation time stamps during a first portion of the initial presentation rate buildup time interval is greater than a second rate of advance of presentation time stamps during a second portion of the initial presentation rate buildup time interval. In some embodiments, the first portion of the initial presentation rate buildup time interval is between 0.5 seconds and 4 seconds. In some embodiments, the presentation rate is increased during an initial buildup time interval of between 60 seconds and 120 seconds.

Figure 7:
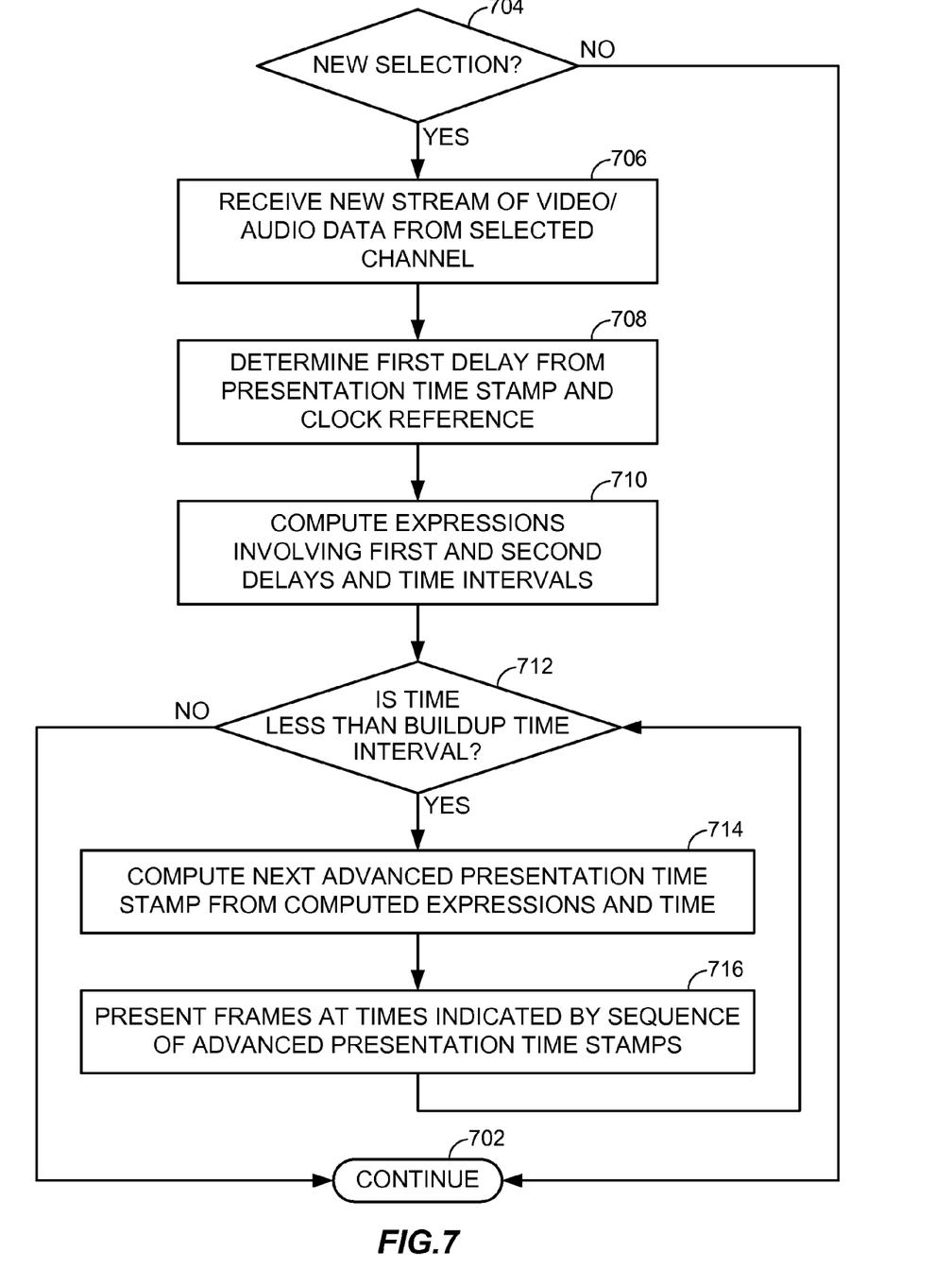
FIG. 7 is a flow chart of an embodiment of a method of presenting video frames during an initial buildup time interval by advancing presentation time stamps.

FIG. 7 is a flow chart of an embodiment of a method of presenting accelerating video frames during an initial buildup time interval by advancing presentation time stamps. The method of FIG. 7 can, for example, be implemented by the video processor 114 of FIGS. 1 and 3. Initially, a video processor receives a presentation demand from the user, such as by receiving user input selecting a first stream of video or switching from one video channel to another, at 704. When it is determined that the user has switched channels, at 704, the video processor immediately starts receiving video frames of the newly selected channel, at 706. A first delay Da associated with a provider of the video frames of the selected channel is determined by detecting the first delay Da from the received video stream of data, at 708. For example, Da may be determined by subtracting a presentation time stamp from a reference clock time stamp for a received first frame. At 710, a function is computed to determine an advance of presentation time stamps, such as the function of FIG. 5 or FIG. 6. Whether the current time is within the buildup time interval is determined, at 712. If the buildup time interval is completed, video frames will continue to be presented for the current channel at a substantially constant presentation rate, at 702. At 714, if the buildup time interval is not completed, a next advanced presentation time stamp is computed according to the function determined at 710. For example, for each particular frame, a presentation time stamp that is originally received for the frame may be modified by subtracting an advance amount that is determined according to the function at 710. Subtracting an advancement amount results in an earlier time stamp for the frame, and therefore an advanced presentation of the frame compared to the original presentation time stamp. Video frames are presented at times indicated by the computed advanced presentation time stamps, at 716. When the buildup time interval is over, at 712, video frames are presented at a substantially constant rate. Note that in some embodiments, a first frame of video may be displayed while determining Da and Db.

Figure 8:
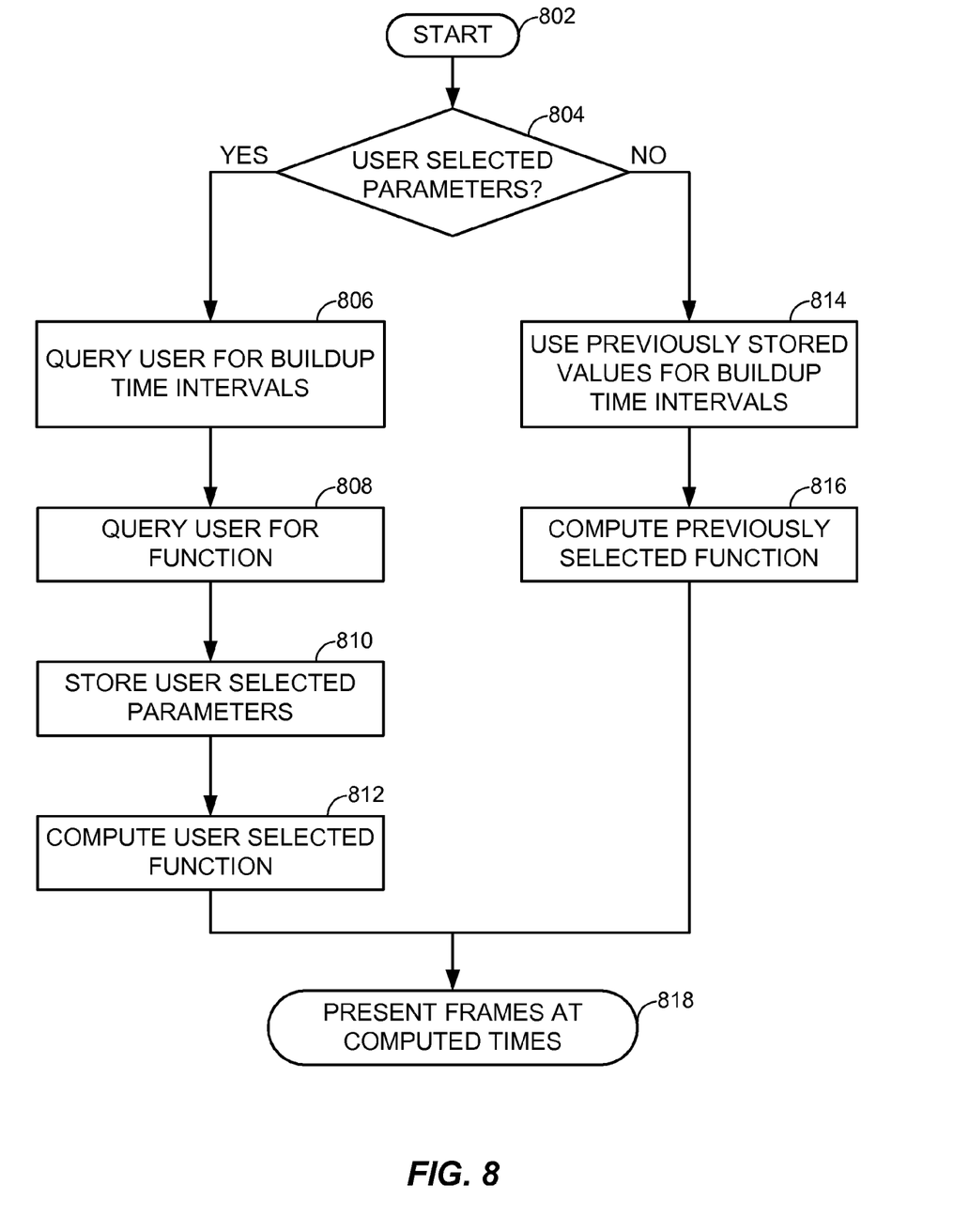
FIG. 8 is a flow chart of an embodiment of a method of receiving function parameters from a user or from a memory.

FIG. 8 is a flow chart of an embodiment of a method of receiving function parameters from a user or from a memory. Starting at 802, a determination is made whether the user is to supply function parameters, at 804. The function parameters may include parameters that enable a video processor to begin play back of video content prior to a designated start time, at an increasing rate, such as according to the functions depicted in FIG. 5 or FIG. 6. If the user is not to provide the function parameters, the previously stored values are used for the time intervals, Ta and Tb at 814. A previously selected function is computed, at 816, and video frames are presented at the computed times, at 818. At 806, if the user is to supply the function parameters, the user is queried for the buildup time values, Ta and Tb. The user is queried to choose a function from a list of two or more functions, at 808. For example, the user may be given the option to choose between the function of FIG. 5 and the function of FIG. 6. User selected parameters are stored for subsequent use, at 810. At 812, the user-selected function is computed, and at 818, video frames are presented at the computed times.

Figure 9:
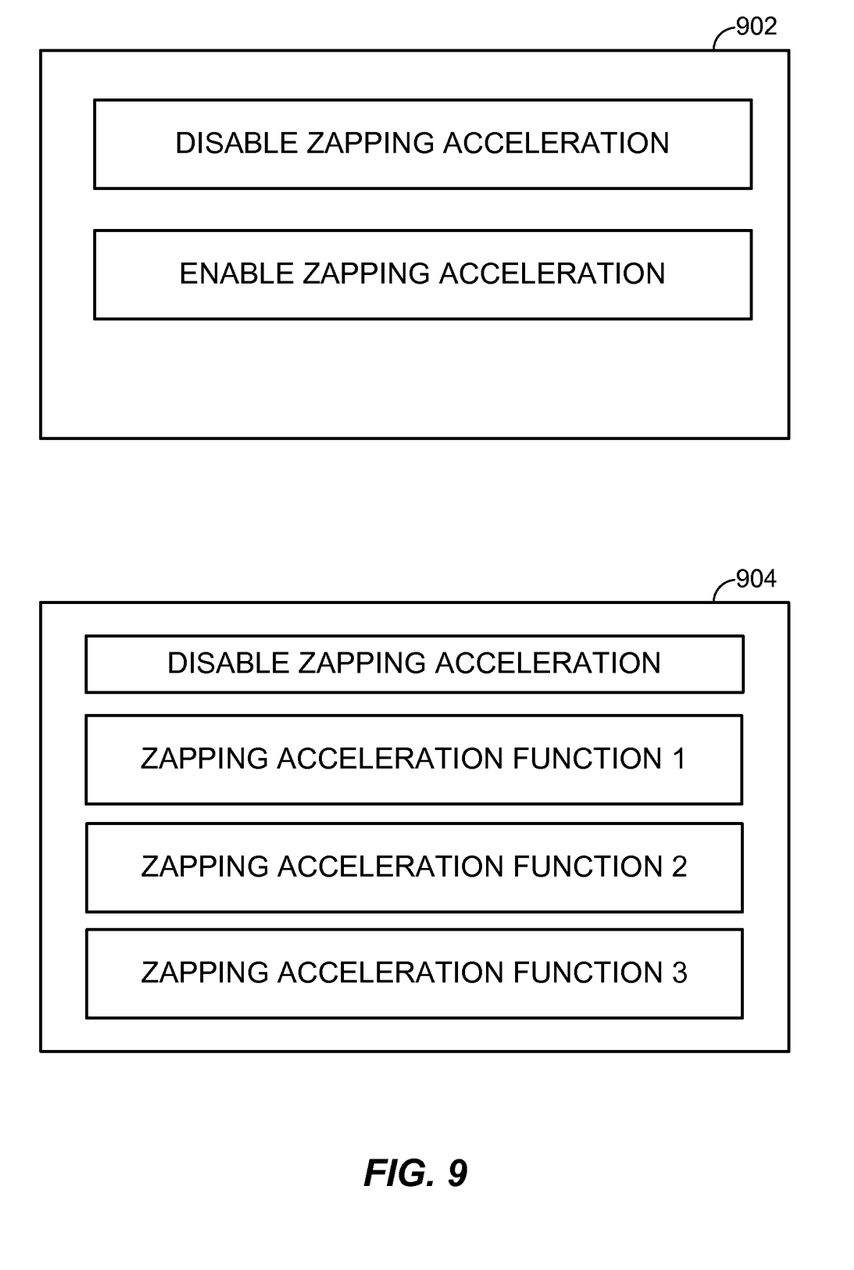
FIG. 9 is a general diagram of user interface views that illustrate user choices for playback acceleration that can be selected.

FIG. 9 is a general diagram of two user interfaces that show user choices for enabling frame rate acceleration or disabling frame rate acceleration. For example, in display 902, the user is given an option to disable frame rate "zapping" acceleration. "Zapping" acceleration is the process described herein of accelerating the presentation of video content from a starting slow rate to a substantially constant presentation rate during an initial buildup time that starts when the user changes channels or otherwise selects a new source of video content. The display 902 also provides an option to enable zapping acceleration.

In display 904, selectable options to disable the zapping acceleration or to choose between three different functions 1, 2 and 3, are provided. For example, one function that may be selected is the function shown in FIG. 5. Another function that may be selected is the function of FIG. 6. Each selectable function may provide a different profile for accelerating the presentation rate from a slow value to a substantially constant rate. Parameters corresponding to a selected function may be selected by the user or obtained from the memory 314 of the video processor 114, as depicted in FIG. 8.

Figure 10:
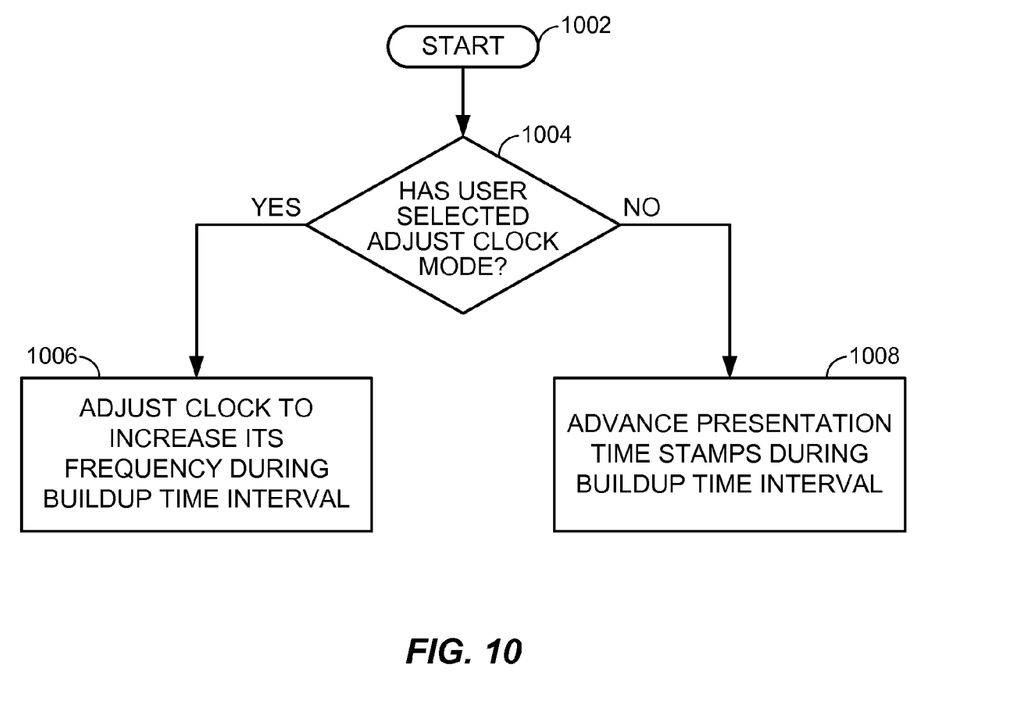
FIG. 10 is a flow chart of an embodiment of a method of selecting between two different ways to determine timing of presentation of video frames.

FIG. 10 is a flow chart of an embodiment of a method of selecting between two different techniques to determine timing of presentation of video frames. Starting at 1002, a determination is made whether the user has selected a clock adjustment mode, at 1004. If the user has selected the clock adjustment mode, a clock frequency of an adjustable clock, such as the adjustable clock 324 of FIG. 3, is increased during the buildup time interval in order to accelerate presentation of video frames until a substantially constant normal presentation rate is reached, at 1006. If the user has not selected the clock adjustment mode, at 1004, advanced presentation time stamps may be computed for increasing the rate of video frame presentation during the buildup time interval, at 1008. For example, the presentation time stamps may be computed as depicted in FIG. 5 or FIG. 6, without adjusting a clock frequency. Note that not all embodiments may provide both a clock adjustment mechanism and an advance presentation time stamp mechanism.

Figure 11:
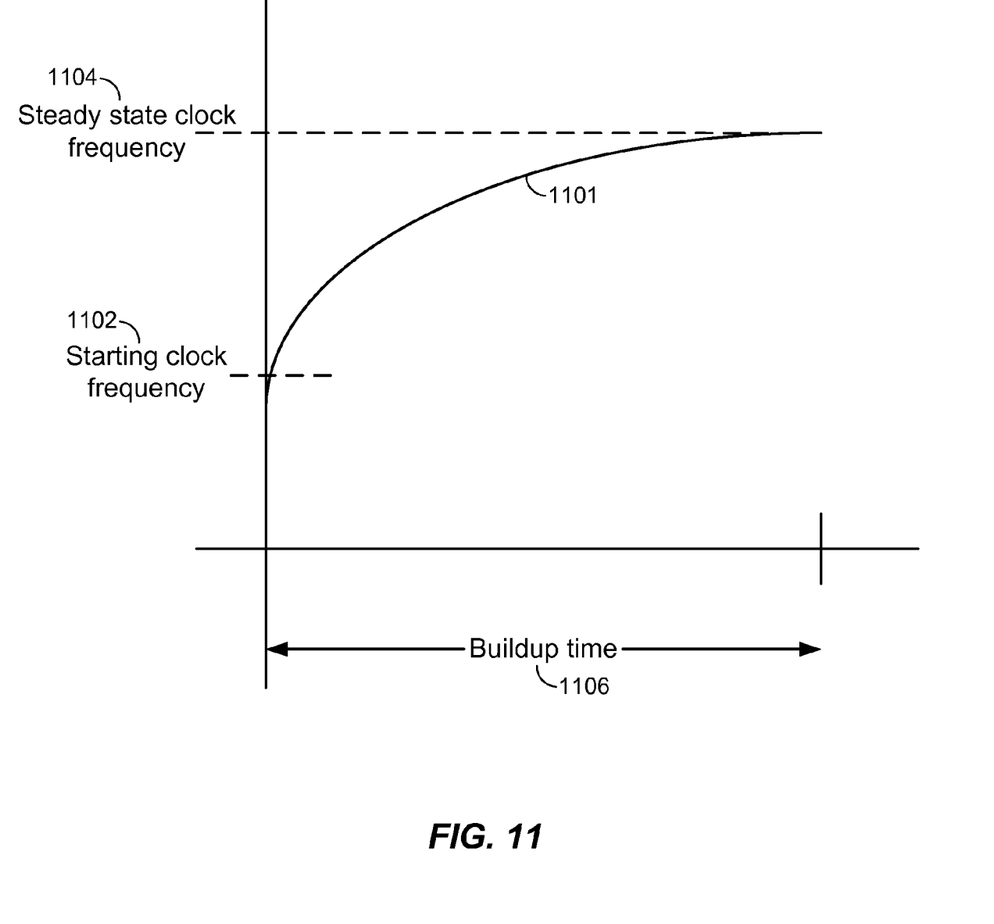
FIG. 11 is a graph of an embodiment of an increasing function depicting an acceleration of a frequency of a clock of a video processor.

FIG. 11 is a graph of an embodiment of an increasing function of time 1101 depicting an acceleration of frequency of an adjustable clock, such as adjustable clock 324 of FIG. 3. In an embodiment employing the function 1101 of FIG. 11, a presentation rate of video frames is adjusted by adjusting the frequency of the adjustable clock 324 of the video processor 114. At the start of the buildup time interval 1106, the starting clock frequency 1102 is less than its full nominal rate 1104. The clock frequency is increased according to the function 1101, which could be exponential, until a steady state (nominal) clock frequency 1104 is reached. When video frames are timed this way, the video frames are presented at a rate that starts out slower than the steady state presentation rate, and increases until a substantially constant presentation rate is reached.

Frame presentation can be controlled by setting a playback clock base time stamp TSP and adjusting a frequency of the playback clock. When the new channel is selected by the user, the video processor can set the playback clock base time stamp $TSP_0$, as given by Eq. (8):

$$TSP_0 = CR_0 + D_a (\approx PTS_0) \quad (8)$$

In Eq. (8), $TSP_0$ is the playback clock base time stamp, TSP at time t=0 and $CR_0$ is the clock reference at the beginning of the buildup time interval. Equation (8) has the effect of advancing the playback clock to a setting as if the delay, Da, has already occurred. Thus, playback according to the presentation time stamps can begin immediately. At times t>0, the clock frequency Cp is controlled to meet the following condition as given by Eq. (9):

$$TSP_t = PTS_t + P(t) - D_b \quad (9)$$

In Eq. (9), $TSP_t$ is TSP at time t, $PTS_t$ is the presentation time stamp at time t and P(t) is the promotion value at time t. Thus, the playback clock frequency begins slower than the reference clock and increases to enable the delay Da+Db to be established after a predetermined time. Note that P(t) can be computed, for example, by equations (1) and (2) or by equation (3).

Figure 12:
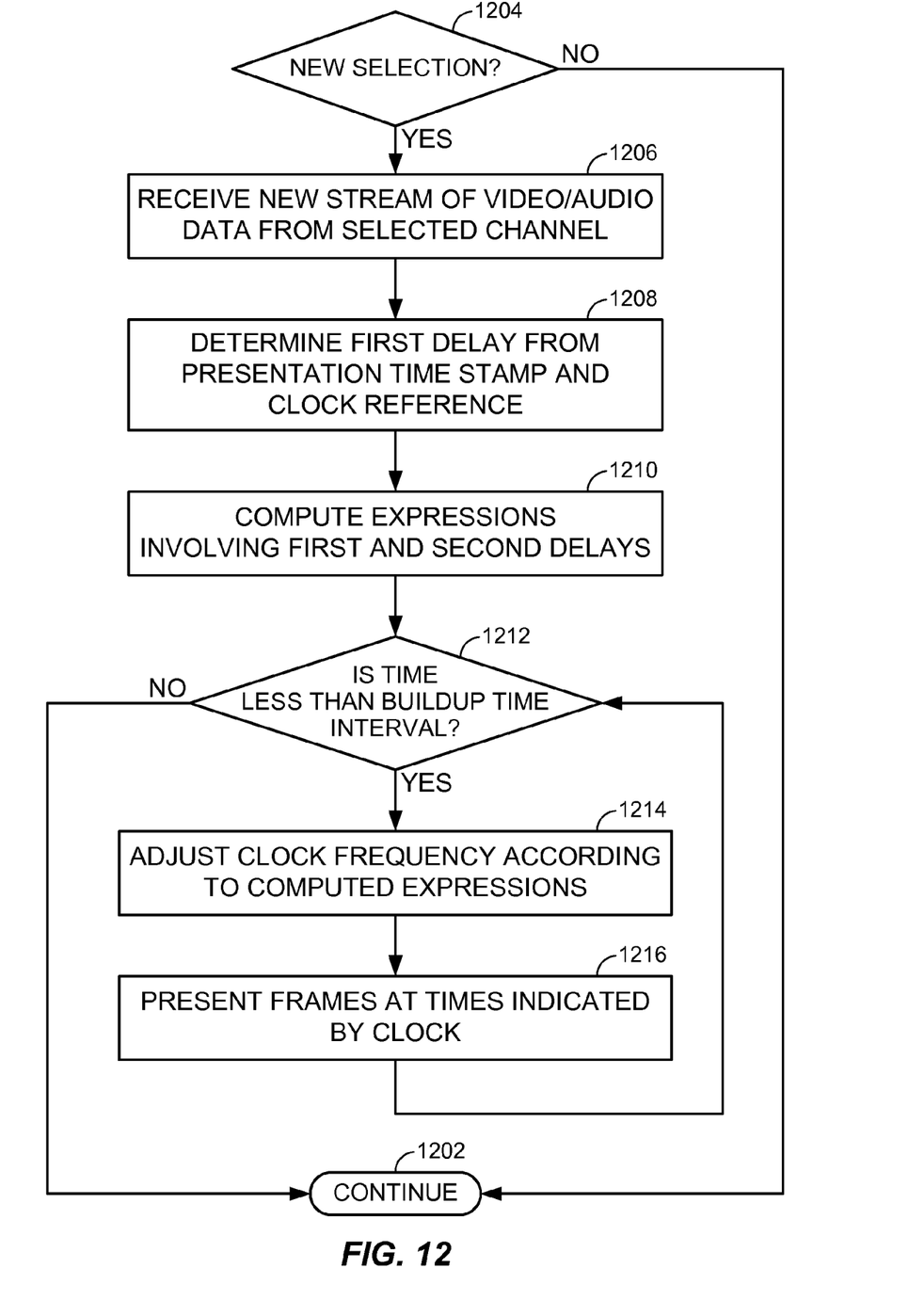
FIG. 12 is a flow chart of an embodiment of a method of presenting accelerating video frames during an initial buildup time interval by adjusting clock frequency.

FIG. 12 is a flow chart of an embodiment of a method of presenting accelerating video frames during an initial buildup time interval by clock frequency adjustment. Initially, a determination is made whether a user has switched channels or has otherwise made a new selection of video, at 1204. When the user has made the selection, a new stream of video and audio data encoding video frames is received from the newly selected channel, at 1206. A first delay, Da, associated with a transmitter of the video frames is determined, at 1208. The first delay, Da, may be determined from timing information received in the video data stream. A second delay, Db, may be determined based on a setting of the video processor to buffer frames prior to playback. Clock acceleration expressions for a function, such as the function 1101 shown in FIG. 11, is computed from the delays, Da and Db, at 1210. A determination is made whether a current time is within the buildup time interval, at 1212. If the buildup time interval is completed, video frames will continue to be presented for the current channel at a substantially constant presentation rate, at 1202. If the buildup time interval is not completed, the clock frequency continues to be adjusted according to the function of the computed expressions, at 1214. Video frames continue to be presented at times indicated by the accelerating clock, at 1216.

Thus, in a particular embodiment, an apparatus includes means for determining a presentation start time from a parameter received with video data. The apparatus also includes means for adjusting a timing of presentation of video frames of the video data during a specified time interval as a function of the parameter so that a rate of presenting the video frames increases with time. The apparatus also includes means for adjusting the timing of presentation of video frames during a specified time interval so that a rate of presenting the video frames increases with time up to a substantially constant presentation rate. The embodiment further comprises means for associating a presentation time stamp in the sequence with a frame of video. The means for adjusting the timing may include means for adjusting the receiver clock frequency during the specified time interval. The means for adjusting the timing may include computing means for computing advanced presentation time stamps. The means for accomplishing these functions of the apparatus may include memory and a processor that is programmed to perform the functions, or may include application specific circuitry, or both. Application specific circuitry may include programmed logic circuitry.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Thus, in another particular embodiment, a computer readable tangible medium includes computer code to cause the computer to determine a first presentation start time from a parameter of received video data. The embodiment also includes computer code to cause the computer to adjust a timing of video frames of the video data to enable presentation of the video frames before the start time and at a rate that increases with time. In some embodiments, adjusting the timing of video frames includes adjusting a clock frequency to cause the video frame presentation rate to increase during a buildup time interval. In some embodiments, adjusting the timing of video frames comprises computing advanced presentation time stamps to cause the video frame presentation rate to increase during a buildup time interval.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of processing video data, the method comprising:
   receiving timing information associated with said video data, the timing information indicative of a start time to start presentation of said video data;
   buffering frames of said video data prior to presentation;
   starting presentation of a first frame of said video data at a time prior to said start time; and
   increasing a presentation rate of said video data prior to said start time, wherein the increasing comprises decreasing a time between playback of adjacent frames,
   wherein, for each frame of said video data, said timing information includes a presentation time stamp for said each frame that indicates a time subsequent to said start time, and
   wherein said increasing the presentation rate comprises calculating, for each frame of said video data, an advanced presentation time stamp for said each frame by subtracting an advance amount from said presentation time stamp for said each frame.

2. The method of claim 1, wherein the presentation rate increases according to a pre-determined function of time.

3. The method of claim 2, wherein the pre-determined function of time includes a piecewise linear function of time.

4. The method of claim 2, wherein the pre-determined function of time is non-linear.

5. The method of claim 4, wherein the pre-determined function of time is exponential.

6. The method of claim 1, wherein, during an initial presentation rate buildup time interval before said start time, a first rate of advance of said advanced presentation time stamps during a first portion of the initial presentation rate buildup time interval is greater than a second rate of advance of said advanced presentation time stamps during a second portion of the initial presentation rate buildup time interval.

7. The method of claim 6, wherein the first portion of the initial presentation rate buildup time interval has a duration of between 0.5 seconds and 4 seconds.

8. The method of claim 1, wherein increasing the presentation rate continues during an initial buildup time interval of between 60 seconds and 120 seconds.

9. The method of claim 1, wherein increasing the presentation rate of said video data comprises adjusting a frequency of a clock of a receiver of said video data.

10. The method of claim 1, wherein increasing the presentation rate of said video data continues until a substantially constant presentation rate is reached.

11. The method of claim 1, wherein a time interval for increasing the presentation rate of said video data is specified by received input.

12. The method of claim 1, further comprising providing a user interface to enable a selection between a first video presentation rate timing method that adjusts a clock frequency of a clock of a receiver and a second video presentation timing method that advances presentation time stamps of frames of said video data.

13. The method of claim 1, wherein starting presentation of said video data at a time prior to said start time is initiated by a change of a video channel and wherein said video data includes Moving Pictures Expert Group (MPEG) video frames.

14. An apparatus, comprising:
    a delay determination element to determine a delayed start time for presenting received video data, based on received timing information associated with the received video data;
    a buffer for buffering frames of the received video data prior to playback; and
    a timing adjustment mechanism to determine a timing of the presentation of a first frame of the received video data during a buildup time interval prior to an indicated start time, wherein the timing of the presentation of video data corresponds to a presentation rate of video data that increases during the buildup time interval, wherein increasing the presentation rate comprises decreasing a time between playback of adjacent frames, wherein said buildup time interval begins prior to said delayed start time.

15. The apparatus of claim 14, wherein the timing adjustment mechanism adjusts a frequency of a clock of a receiver of said video data during the buildup time interval.

16. The apparatus of claim 14, wherein the timing adjustment mechanism is configured to compute advanced presentation time stamps.

17. The apparatus of claim 16, further comprising a video frame presenter to present video frames of said video data according to the computed advanced presentation time stamps.

18. The apparatus of claim 14, further comprising a display to display said video data.

19. The apparatus of claim 14, wherein the timing adjustment mechanism determines the timing of the presentation as a function of time according to parameters stored in a memory of the apparatus.

20. The apparatus of claim 14, further comprising circuitry to enable wireless communication of said video data.

21. A method of processing video data, said method comprising:
    calculating a presentation delay for a first frame of the video data, based on a difference between a first time indicated by a reference clock time stamp for said first frame and a second time indicated by a presentation time stamp for said first frame;
    buffering frames of the video data prior to presentation; and
    based on the presentation delay, adjusting a timing of presentation of a plurality of video frames of the video data to initiate presentation of said plurality of video frames during a time interval that is prior to said second time,
    wherein, for each video frame of said plurality of video frames, and prior to said adjusting, a presentation time stamp for said each video frame indicates a time subsequent to said second time, and
    wherein said adjusting comprises calculating, for each video frame of said plurality of video frames, an advanced presentation time stamp for said each video frame by subtracting an advance amount from said presentation time stamp for said each video frame.

22. The method of processing video data according to claim 21, wherein, for each video frame of said plurality of video frames, said advanced presentation time stamp for said each video frame indicates a time prior to said second time.

23. The method according to claim 21, wherein performing said calculating the presentation delay occurs in response to a presentation demand.

24. An apparatus for processing video data, said apparatus comprising:
    means for calculating a presentation delay for a first frame of the video data, based on a difference between a first time indicated by a reference clock time stamp for said first frame and a second time indicated by a presentation time stamp for said first frame;
    a buffer for buffering a plurality of video frames of the video data prior to presentation; and
    means for adjusting a timing of presentation of said plurality of video frames of the video data to initiate presentation of said plurality of video frames during a presentation time interval that is prior to said second time, wherein said adjusting is based on the presentation delay,
    wherein, for each video frame of said plurality of video frames, and prior to said adjusting, a presentation time stamp for said each video frame indicates a time subsequent to said second time, and
    wherein said adjusting comprises calculating, for each video frame of said plurality of video frames, an advanced presentation time stamp for said each video frame by subtracting an advance amount from said presentation time stamp for said each video frame.

25. The apparatus of claim 24, wherein the means for adjusting the timing comprises means for adjusting a clock frequency of a clock of a receiver of said video data during the presentation time interval.

26. The apparatus of claim 24, wherein the means for adjusting the timing comprises computing means for computing said advanced presentation time stamps.

27. The apparatus for processing video data according to claim 24, wherein, for each video frame of said plurality of video frames, said advanced presentation time stamp for said each video frame indicates a time prior to said second time.

28. A non-transitory computer-readable tangible medium storing computer code, comprising:
    computer code to cause a computer to calculate a presentation delay for a first frame of the video data, based on a difference between a first time indicated by a reference clock time stamp for said first frame and a second time indicated by a presentation time stamp for said first frame;
    computer code to cause a computer to buffer frames of the video data prior to presentation; and
    computer code to cause a computer to adjust a timing of presentation of a plurality of video frames of the video data to initiate presentation of said plurality of video frames during a presentation time interval that is prior to said second time, wherein said adjusting is based on the presentation delay,
    wherein, for each video frame of said plurality of video frames, and prior to said adjusting, a presentation time stamp for said each video frame indicates a time subsequent to said second time, and
    wherein said adjusting comprises calculating, for each video frame of said plurality of video frames, an advanced presentation time stamp for said each video frame by subtracting an advance amount from said presentation time stamp for said each video frame.

29. The non-transitory computer-readable tangible medium of claim 28, wherein the computer code to cause the computer to adjust the timing of presentation includes computer code to adjust a clock frequency of a clock of a receiver of said video data during the presentation time interval.

30. The non-transitory computer-readable tangible medium of claim 28, wherein the computer code to cause the computer to adjust the timing of presentation includes computer code to compute said advanced presentation time stamps.

31. The non-transitory computer-readable tangible medium according to claim 28, wherein, for each video frame of said plurality of video frames, said advanced presentation time stamp for said each video frame indicates a time prior to said second time.

* * * * *